(12) United States Patent
Artelsmair et al.

(10) Patent No.: US 8,389,900 B2
(45) Date of Patent: Mar. 5, 2013

(54) METHOD FOR WELDING A WORKPIECE

(75) Inventors: Josef Artelsmair, Wartberg/Krems (AT); Josef Leeb, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 1170 days.

(21) Appl. No.: 12/226,242

(22) PCT Filed: Feb. 12, 2007

(86) PCT No.: PCT/AT2007/000068
§ 371 (c)(1),
(2), (4) Date: Oct. 21, 2008

(87) PCT Pub. No.: WO2007/115342
PCT Pub. Date: Oct. 18, 2007

(65) Prior Publication Data
US 2009/0242534 A1    Oct. 1, 2009

(30) Foreign Application Priority Data
Apr. 12, 2006    (AT) .................................. A 632/2006

(51) Int. Cl.
*B23K 9/12* (2006.01)
(52) U.S. Cl. ............ 219/137 PS; 219/137.2; 219/137.7; 219/137.71
(58) Field of Classification Search ............. 219/137 PS, 219/137 R, 136, 137.71, 137.7, 137.2, 137.8
See application file for complete search history.

(56) References Cited

U.S. PATENT DOCUMENTS

| | | | | |
|---|---|---|---|---|
| 4,100,390 A | * | 7/1978 | Jackson | ........................... 219/74 |
| 6,156,998 A | * | 12/2000 | Takahashi et al. | ........ 219/130.21 |
| 6,548,784 B2 | * | 4/2003 | Sammons et al. | ............. 219/132 |

(Continued)

FOREIGN PATENT DOCUMENTS

| | | |
|---|---|---|
| EP | 0 668 711 | 8/1995 |
| EP | 1 712 320 | 10/2006 |

(Continued)

OTHER PUBLICATIONS

Machine translation of JP 05-245637, accessed May 15, 2012.*

(Continued)

*Primary Examiner* — Henry Yuen
*Assistant Examiner* — John Wasaff
(74) *Attorney, Agent, or Firm* — Collard & Roe, P.C.

(57) ABSTRACT

The invention describes a method for welding a workpiece (16) with a consuming welding wire (13), the latter being moved substantially towards the workpiece (16) by a wire feeder (11) during a welding process, wherein a process is started and performed for removing slag (42) from the end of the welding wire (13). In order to create a welding method which is not affected by slag (42) possibly adhering to the end of the welding wire (13) to be contacted and which ensures a safe ignition of the electric arc (15), it is provided that the welding current (I) will be reduced to a minimum value as soon as the slag-removing process is started, and during the slag-removing process, that the welding wire (13) will be cyclically moved towards the workpiece (16) by a predetermined path length in a fast recurrent forward/backward movement and will again be moved away from the workpiece (16) by a smaller path length until short-circuit detection between the welding (13) and the workpiece (16), by a short-circuit monitoring unit upon which the slag-removing process will be finished.

12 Claims, 3 Drawing Sheets

U.S. PATENT DOCUMENTS 6,809,293 B2 * 10/2004 Sammons et al. ............ 219/132
7,271,365 B2 9/2007 Stava et al.

FOREIGN PATENT DOCUMENTS

| JP | 57-175079 | 10/1982 |
|---|---|---|
| JP | 62-166077 | 7/1987 |
| JP | 04 143074 | 5/1992 |
| JP | 5-245637 | 9/1993 |
| JP | 11-156544 | 6/1999 |
| JP | 2000-153358 | 6/2000 |
| JP | 2003-200262 | 7/2003 |
| JP | 2003-311405 | 11/2003 |

OTHER PUBLICATIONS

Machine translation of JP 11-156544, accessed May 15, 2012.*
Machine translation of JP 2000-153358, accessed May 15, 2012.*
Machine translation of JP 2003-311405, accessed May 15, 2012.*
Japanese Office Action dated Aug. 9, 2011 in Japanese Patent Application No. 2009-504522 along with an English translation of same.
International Search Report.
International Search Report, dated Jun. 13, 2007.
Austrian Preliminary Office Action dated Dec. 18, 2006 in A 632/2006 with English translation of the relevant parts.

* cited by examiner

METHOD FOR WELDING A WORKPIECE

CROSS REFERENCE TO RELATED APPLICATIONS

This application is the National Stage of PCT/AT2007/000068 filed on Feb. 12, 2007, which claims priority under 35 U.S.C. §119 of Austrian Application No. A 632/2006 filed on Apr. 12, 2006. The international application under PCT article 21(2) was not published in English.

BACKGROUND OF THE INVENTION

1. Field of the Invention

The invention relates to a method for welding a workpiece with a consuming welding wire, the latter being moved substantially towards the workpiece by a wire feeder during a welding process, with an electric arc burning between the welding wire and the workpiece, wherein a process is started and performed for removing slag from the end of the welding wire.

2. The Prior Art

Welding methods including processes for removing slag have already been known from the prior art. For example, JP 4143074 A shows a method, wherein the slag is removed by rubbing the welding wire on the workpiece. Yet, this requires a movement of the entire robot arm to which the welding torch is attached. Moreover, there is the danger that the welding wire will bend due to the mechanical influence.

In the method according to JP 5245637 A, in case of ignition problems, the welding wire is pressed against the surface of the workpiece at a certain pressure, thus removing the slag. Also here, the welding wire might be damaged.

SUMMARY OF THE INVENTION

The object of the invention is to create a welding method which is not affected by slag possibly adhering to the end of the welding wire to be contacted, and which ensures a safe ignition of the electric arc.

The object of the invention is achieved in that the welding current will be reduced to a minimum value as soon as the slag-removing process is started, and that the welding wire will be cyclically moved towards the workpiece by a predefined path length in a fast recurrent forward/backward movement and will again be moved away from the workpiece by a smaller path length until short-circuit detection by a short-circuit monitoring unit between the welding wire and the workpiece upon which the slag-removing process will be finished. Due to the inventive method there is no need for the welding process to be interrupted because of slag possibly adhering to the end of the welding wire to be contacted and preventing the electric arc from being ignited. The slag-removing process ensures that the electric arc for the next welding process will be started in a safe manner and substantially without any delay. The slag-removing process may be realized in a suitable welding device in a relatively simple way since a short-circuit monitoring unit known per se may be used for short-circuit detection. Since the welding current will be reduced to a minimum value as soon as the slag-removing process is started, the electric arc will be prevented from igniting during this time while a short circuit will nevertheless be detected.

The slag-removing process may be performed at a time interval at the beginning of a ignition process, at a time interval during an ignition process or at a time interval prior to an ignition method.

After the slag has been removed from the welding wire, the electric arc will preferably be ignited by what is known as SFI process (spatter-free ignition process), wherein a low welding current is applied to the welding wire and the latter will be continuously moved forwards towards the workpiece until contacting the same, the wire-feed direction will be reversed after a short circuit has occurred, and the welding wire will be continuously moved away from the workpiece so that the electric arc will be ignited when the welding wire is lifted off. Optionally, the welding wire is fed backwards to a predefined distance to the workpiece. This means that the slag-removing process is performed prior to the SFI process, with the slag being removed automatically until short-circuit detection. The electric-arc ignition process, which is adapted to the respective welding process, will not be affected by the slag-removing process. The welding wire is fed substantially towards the workpiece during the slag-removing process, whereby the impact force of the welding wire on the workpiece will be increased, thus accelerating the slag removal.

It is also of advantage if the motor current of the wire feeder is monitored and at least the first contact of the welding wire with the workpiece is detected. This allows for the workpiece to be prevented from being deformed by the feed power of the welding wire, even if the short-circuit monitoring unit has not yet detected a short circuit and the slag-removing process has consequently not been finished yet.

Advantageously, the contact of the welding wire with the workpiece will be detected when the motor current has exceeded a predefined threshold value over a defined period of time.

The cyclic, fast recurrent forward/backward movement of the welding wire for slag-removal is preferably performed at an adjustable frequency of between 50 Hz and 150 Hz. By this relatively high frequency it is achieved that the duration of the welding process will not substantially be prolonged by the time the slag-removing process takes.

According to a further feature of the invention, it is provided for the cyclic, fast recurrent forward/backward movement of the welding wire to be done for slag removal at a frequency which corresponds to the movement frequency of the welding wire during the welding process set.

It is also advantageous that as soon as the slag-removal process ends, the welding current will be increased to a value necessary for the ignition process following thereupon, thus allowing for the electric arc to be ignited immediately after the slag-removing process has been finished.

Due to the measure that the slag-removing process will be finished after an adjusted period of time an unnecessary loss of time can be prevented if the slag present at the end of the welding wire to be contacted is not detached by the slag-removing process.

Here, the period of time adjusted preferably starts when the welding wire first contacts the workpiece, with no short circuit having been detected.

BRIEF DESCRIPTION OF THE DRAWINGS

The present invention will now be explained in more detail by way of the schematic drawings enclosed. Therein.

DETAILED DESCRIPTION OF THE PREFERRED EMBODIMENTS

Initially, it is pointed out that same parts of the exemplary embodiment will have the same reference numbers.

Figure 1:
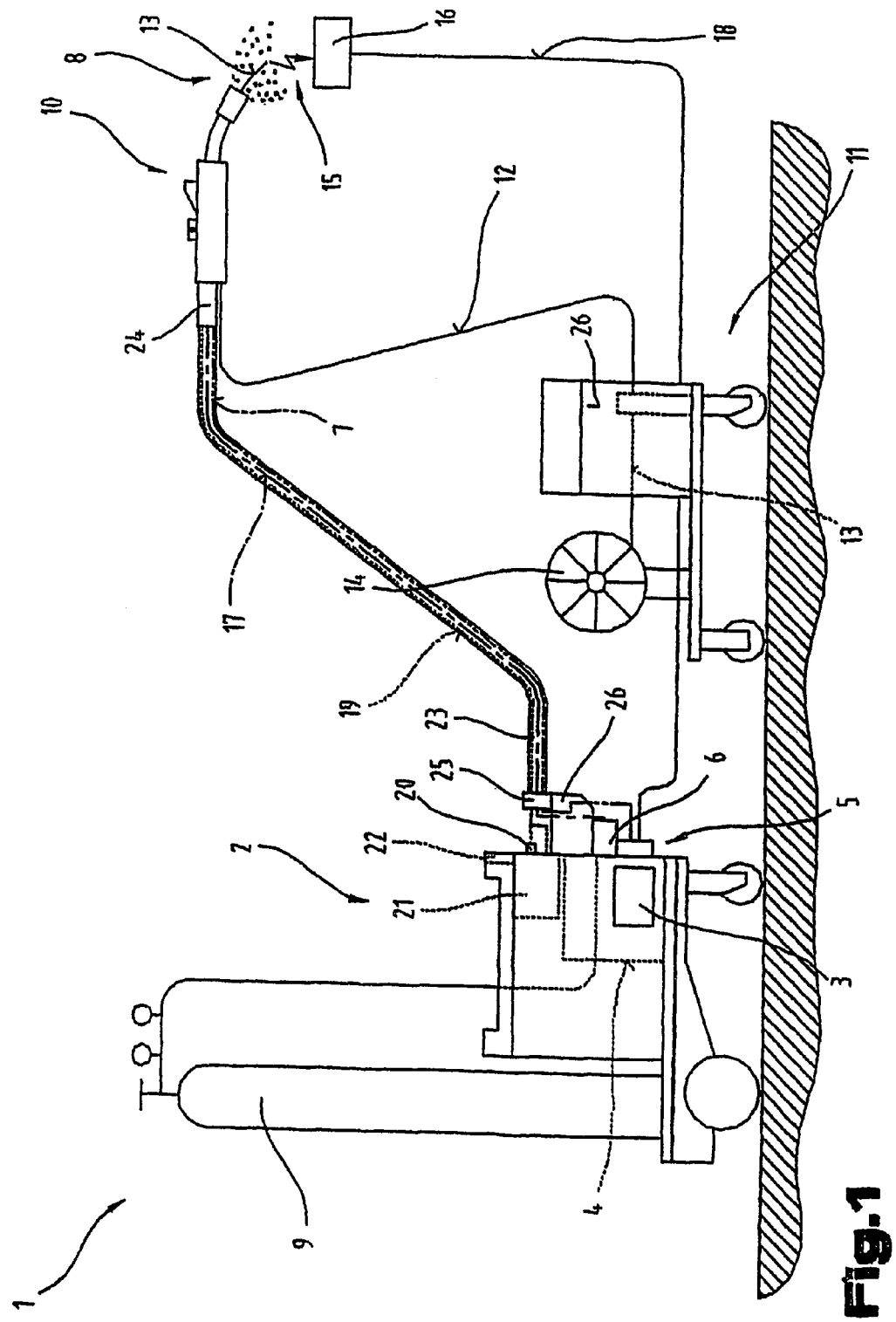
FIG. 1 shows a schematic representation of a welding plant or a welding device.

FIG. 1 depicts a welding device 1 or welding plant for the most various processes or methods such as, e.g., MIG/MAG welding or WIG/TIG welding, or electrode welding methods, double-wire/tandem welding methods, plasma or soldering methods etc.

The welding device 1 comprises a power source 2 including a power element 3, a control unit 4, and a switch member 5 associated with the power element 3 and/or the control unit 4. The switch member 5 and/or the control unit 4 is (are) connected to a control valve 6 arranged in a feed line 7 for a protective gas 8, such as, e.g., $CO_2$, helium or argon and the like, between a gas reservoir 9 and a welding torch 10, or a torch.

Besides, a wire feeder 11 as is usually employed in MIG/MAG welding can also be activated by the control unit 4, wherein additional material or welding wire 13 is fed from a feed drum 14, into the region of the welding torch 10 via a feed line 12. It is, of course, possible to integrate the wire feeder 11 in the welding device 1 and, in particular, in its basic housing, rather than designing the same as an accessory device, as is illustrated in FIG. 1.

It is also feasible for the wire feeder 11 to feed the welding wire 13, outside the welding torch 10 to the process site, to which end a non-consumable electrode is preferably arranged in the welding torch 10, as is usually the case with WIG/TIG welding.

The current for building up an electric arc 15 between the non-consumable electrode and a workpiece 16 is supplied from the power element 3 of the power source 2 to the welding torch 10 and, in particular, to the electrode via a welding line 17, wherein the workpieces 16 to be welded, is likewise connected with the welding device 1 and, in particular, power source 2 via a further welding line 18, thus enabling a power circuit for a process to build up over the electric arc 15 or plasma jet formed.

To provide cooling of the welding torch 10, the welding torch 10 may be connected with a fluid reservoir and, in particular, with a water reservoir 21 by a cooling circuit 19 via an interposed flow control 20, whereby the cooling circuit 19 and, in particular, a fluid pump used for the fluid contained in the water reservoir 21, is started as the welding torch 10 is put into operation, in order to effect cooling of the welding torch 10.

The welding device 1 further comprises an input and/or output device 22, via which the most different welding parameters, operating modes or welding programs of the welding device 1 can be set and called. In doing so, the welding parameters, operating modes or welding programs set by the input and/or output device 22 are transmitted to the control device 4, which, in turn, will subsequently activate the individual components of the welding device 1, and predefine the respectively desired control values.

In the exemplary embodiment illustrated, the welding torch 10 is, furthermore, connected with the welding device 1 via a hose pack 23. The hose pack 23 accommodates the individual lines leading from the welding device 1 to the welding torch 10. The hose pack 23 is connected with the welding torch 10 via a coupling device 24, whereas the individual lines arranged within the hose pack 23 are connected with the individual contacts of the welding device 1 via connection sockets or plug-in connections. In order to ensure an appropriate strain relief of the hose pack 23, the hose pack 23 is connected with a housing 26 and, in particular, the basic housing of the welding device 1 via a strain relief means 25. It is, of course, possible to use the coupling device 24 also for the connection to the welding device 1.

Not all of the aforementioned components need be used or employed in the various welding methods or welding devices 1, such as, e.g., WIG devices or MIG/MAG devices or plasma devices. In this context it is, for instance, feasible to design the welding torch 10 as an air-cooled welding torch 10.

With the welding device 1 described a welding process may be performed, e.g. a cold-metal-transfer welding process, hereinafter CMT. A welding process is always started by an ignition of the electric arc 15, wherein the ignition may be effected, e.g. by a contact ignition or a high-frequency ignition. The ignition process for igniting the electric arc 15 is effected, e.g., via the lift-arc principle or SFI process known from the prior art. Here, the welding wire 13 is continuously fed forwards at a low welding current until contact with the workpiece 16, the wire-feed direction will be reversed after a short circuit has occurred, and the welding wire 13 will be continuously moved away from the workpiece 16 so that the electric arc 15 will be ignited when the welding wire 13 is lifted off, and the welding wire 13 will optionally be fed backwards to a predefined distance to the workpiece 16. Thus, the electric arc 15 is built up, allowing for the welding process proper to be started.

With the contact ignition described just now it is essential that the electrically conductive welding wire 13 does contact the workpiece 16. The control unit 4 detects this via a short-circuit detection known from the prior art and, thereafter, it will change the feed direction of the welding wire 13.

Figure 2:
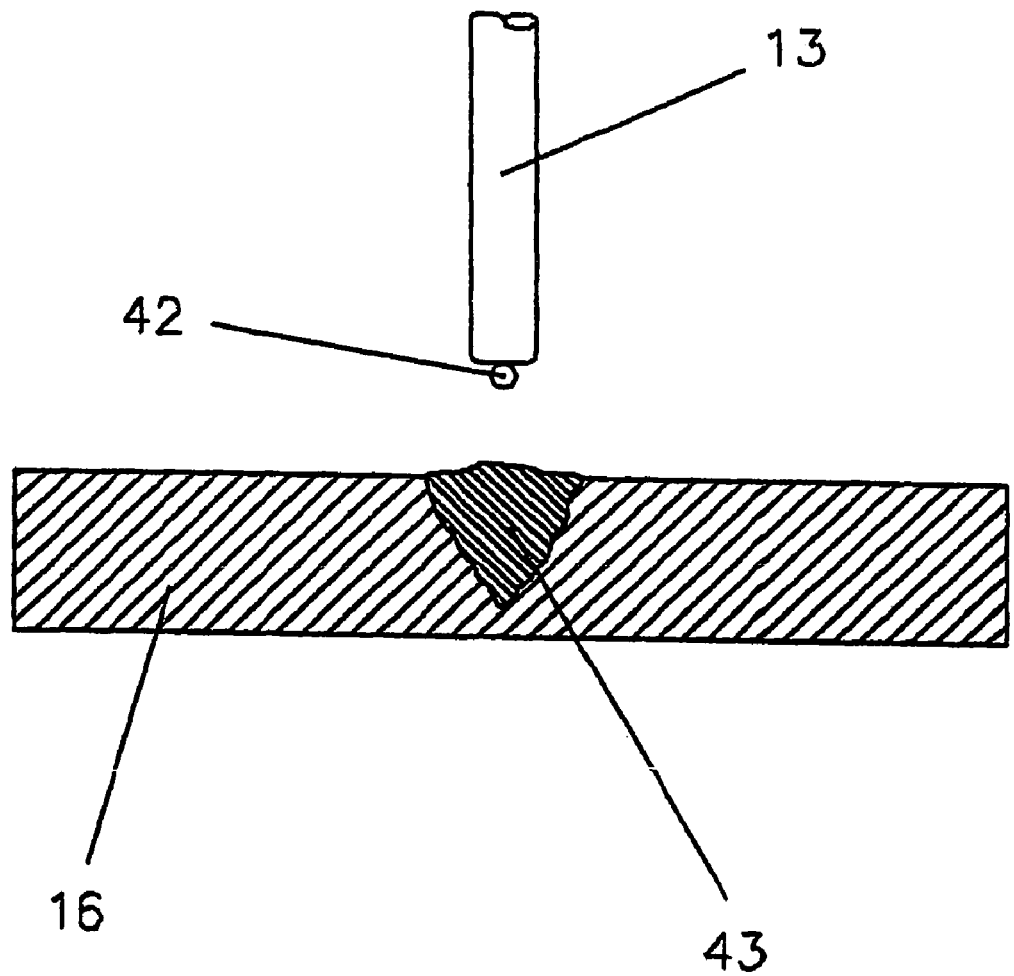
FIG. 2 shows a schematic representation of the end of the welding wire to be contacted, with slag adhering thereto.

Yet, if slag 42, which is either electrically non-conductive or poorly conductive, is present at the end of the welding wire 13 to be contacted, as illustrated in FIG. 2, the slag 42 will first contact the workpiece 16, whereby no electric contacting and, consequently, no ignition of the electric arc 15 can be possible. Only a small amount of slag 42, e.g. in the form of a sphere or a cap, present at the end of the welding wire 13 to be contacted often already prevents the electric contacting and, thus, ignition from taking place. Methods known for a better ignition of the electric arc 15, e.g. creating as small an ignition cross section of the welding wire 13 as possible at the end of the welding process, cannot eliminate this problem.

The reason is that the welding wire 13 is moved backwards from a melting bath 43 when the welding process is finished, wherein part of the slag 42 present on the surface of the melting bath 43 still adheres to the end of the welding wire 13. Moreover, slag 42 may form at the end of the welding wire 13 if the liquid end of the welding wire 13 solidifies at the end of the welding process. Often this is the case during welding of steel and/or steel alloys. Thus, the slag 42 prevents, or impedes, the ignition of the electric arc 15 at the beginning of the welding process since no current flow from the welding wire 13 to the workpiece 16 is established. This is why no short circuit will be detected by a short-circuit monitoring unit either and the welding wire 13 will be fed farther towards the workpiece 16, which may lead to a damaged or even deformed workpiece 16. This may be prevented, e.g., by monitoring the motor current of the wire feeder 11 by stopping the welding wire 13 from being fed when the welding current has exceeded a predefined threshold value over a certain period of time. This is possible since the feed force and the motor current are proportional to each other.

To allow for re-ignition of the electric arc 15, e.g., the end of the welding wire 13 to be contacted and, thus, the adhering, electrically non-conductive slag 42 has to be removed in a manual or automatic fashion or the wire end has to be cut off.

It would also be another possibility to change the angle of impact of the welding wire 13 relative to the workpiece 16, whereby the conducting welding wire 13 may possibly contact the workpiece 16 at the edge zone of the slag 42, a short circuit will be detected and the electric arc 15 will be ignited by reversing the feed direction of the welding wire 13. Yet, the resulting effort necessary for programming the robot, which guides the welding torch 10, is very high.

According to the invention, it is now provided for the slag 42 present at the end of the welding wire 13 to be removed by an appropriate movement of the welding wire 13. Here, the welding wire 13 is cyclically fed forwards by a certain path length at a high speed and again fed backwards by a smaller path length. This results in a repeated shock-like contact of the end of the welding wire 13 with the workpiece 16, which end is to be contacted and to which slag 42 adheres, whereby the slag 42 will be detached from the end of the welding wire 13 by the mechanical force effect when the welding wire 13 impacts the workpiece 16.

Figure 3:
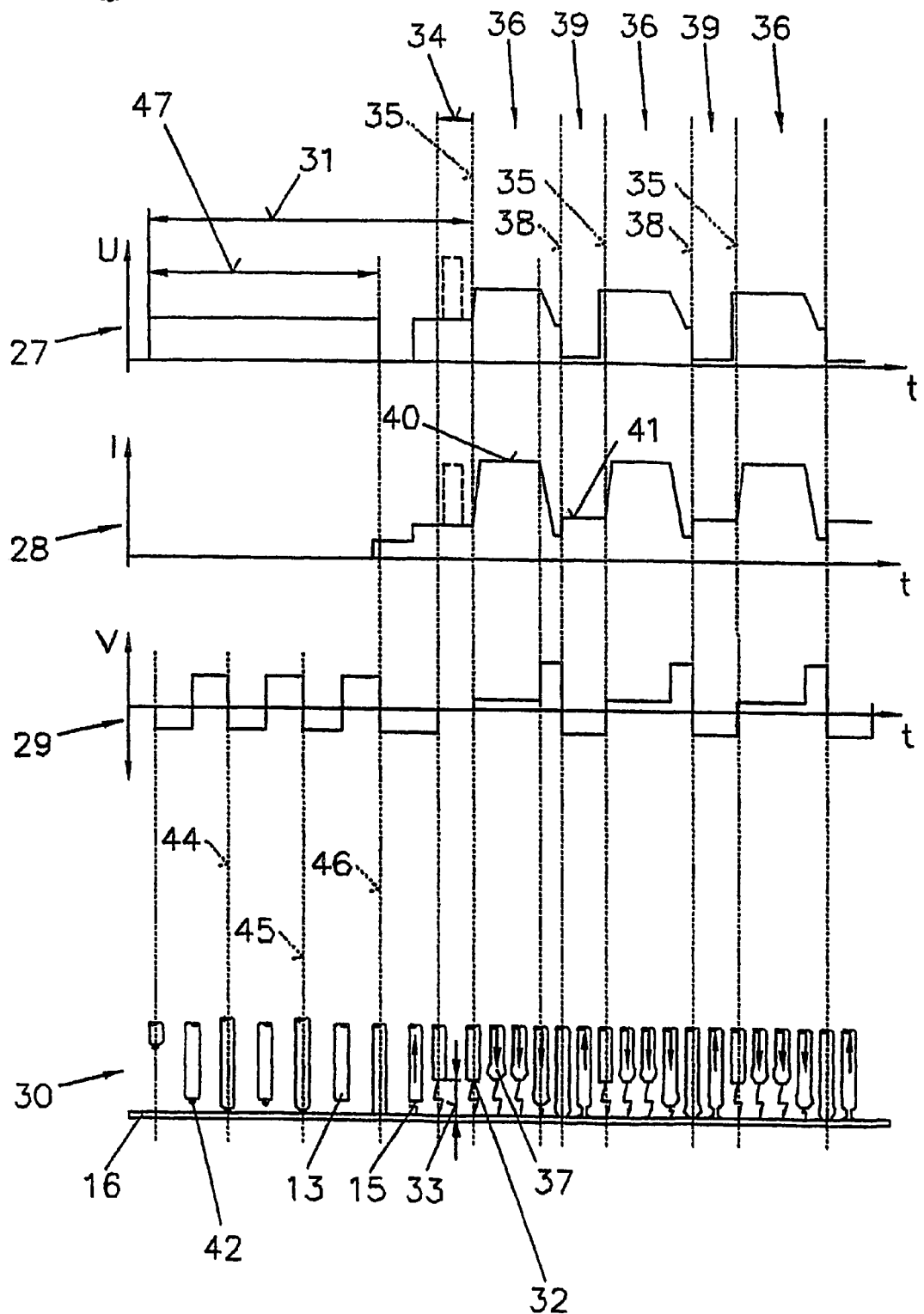
FIG. 3 schematically shows the time courses of the welding voltage, the welding current, and a motion diagram for the welding wire during an exemplary welding process with the inventive method.

FIG. 3 schematically shows the inventive method for removing the slag 42 from the end of the welding wire 13 during a CMT welding process by means of diagrams 27 to 30, which illustrate the time course of the welding voltage U, the welding current I, the feed speed and of the movements and/or positions of the end of the welding wire 13 relative to the workpiece 16.

A consumable electrode and/or a welding wire 13 is used with the welding process illustrated for controlling the welding device 1 and/or the welding-current source. Here, the workpiece 16 and the welding wire 13 are melted on via the ionized plasma column and/or the electric arc 15 which is being established between the welding wire 13 and the electric antipole on the workpiece 16, i.e. ignited. This takes place during an ignition phase 31, during which the ignition process, e.g. the SFI, is performed. The ignition phase 31 is started, e.g., by a user pushing a pushbutton on the welding torch 10 or by automatic pushing of the same.

To prevent the electric arc 15 from possibly being not ignited because of slag 42 adhering to the welding wire 13, the inventive slag-removing process is performed at the beginning of the ignition phase 31 at a time interval 47 of the ignition process.

Here, with the slag-removing process, the welding wire 13 is not continuously fed towards the workpiece 16 but is fed forwards, i.e. towards the workpiece 16, at a certain frequency and, again, fed backwards, i.e. away from the workpiece 16. Here, at a high speed, the welding wire 13 is fed forwards by a certain pathlength and, again, fed backwards by a smaller path-length so that the welding wire 13 is moved farther towards the workpiece 16 than away from the same. Here, the frequency at which the welding wire 13 is moved forwards/backwards preferably is between 50 Hz and 150 Hz. Of course, it is also possible to use lower or higher frequencies for the slag-removing process. In this context, it has to be made sure that the duration of the slag-removing process is defined with the frequency. This is why particularly higher frequencies are of importance since they lead to a significant reduction of said duration.

Thus, until contact with the workpiece 16, the welding wire 13 will be fed with a fast recurrent forward/backward movement, e.g. at a frequency adjusted to 75 Hz.

Thus, the slag 42 adhering to the welding wire 13, as can be seen at point of time 44, contacts the workpiece 16. Because of the electrically non-conductive slag 42 no short-circuit is detected by the control unit 4 and/or the short-circuit monitoring unit at point of time 44, and the welding wire 13 will be recurrently moved backwards and forwards at a frequency adjusted to 75 Hz. This results in that the welding wire 13, which is fed at a corresponding feed force, recurrently impacts the workpiece 16 with a certain impact force. Finally, the slag 42 is detached from the end of the welding wire 13 to be contacted, as is illustrated at point of time 45, and the control unit 4 may detect a short-circuit, as can be seen at point of time 46, and finish the slag-removing process.

Thus, there will be a current transfer from the welding wire 13 to the workpiece 16, thereby introducing ignition of the electric arc 15 for the next welding process and/or continuing the ignition process. When the ignition process has been continued, e.g. also the movement of the welding torch 10 or the workpiece 16 will be started in case of automated welding processes and the welding will be performed. Of course, the welding torch 10 or the workpiece 16 does not move during removal of the slag 42 so that the planned or programmed welding-starting point will be observed.

The fast recurrent forward/backward movement of the welding wire 13 will be finished when a short-circuit has been detected after the first contact of the welding wire 13 with the workpiece 16, i.e. when no slag 42 adheres to the end of the welding wire 13 to be contacted. This means that in this case there is no slag-removing process but only the recurrent forward/backward movement of the welding wire 13 takes place at the beginning of the ignition process, introducing the slag-removing process.

In the just-described method for removing slag 42, the welding wire 13 is fed farther towards the workpiece 16 than away therefrom. Likewise, it is also possible that the welding wire 13 is not fed farther towards the workpiece 16 between the points of time 44 and 46 but that only substantially as much welding wire 13 is again fed forwards as was fed backwards before.

This is effected, e.g., in that after the recurrent forward/backward movement of the welding wire 13 relative to the workpiece 16, the first contact of the welding wire 13 with the workpiece 16 will be detected by a motor-current monitoring unit. Here, the current of the motor(s), which feed(s) the welding wire 13 from the feed drum 14 as far as into the welding torch 10 and/or to the workpiece 16, are appropriately monitored.

If to high a motor current over a certain or defined period of time is detected and/or measured by the motor-current monitoring unit, the slag 42 will prevent a short circuit between the workpiece 16 and the welding wire 13. Here, to remove the slag 42, the feed of the welding wire 13 will be changed in a manner that during the fast recurrent forward/backward movement, the welding wire 13 will be moved substantially as far forwards as backwards. Thus, the slag 42 present at the end of the welding wire 13 to be contacted will be removed, and the danger that the workpiece 16 and/or the welding wire 13 will be deformed by the recurrent impact of the welding wire 13 on the workpiece 16 will be substantially reduced. Thus, the slag-removing process will be finished after a short-circuit has been detected, and the ignition process can be continued.

Of course, a method for removing the slag 42 is also conceivable, wherein the welding wire 13 is continuously fed forwards until first contact with the workpiece 16. If the control unit 4 detects no short circuit after a predefined period of time or if the motor current exceeds a predefined value over a certain period of time, i.e. if the slag 42 is present at the end of the welding wire 13 to be contacted, the ignition process will be interrupted and the slag-removing process will be introduced. Here, the slag-removing process also occurs at time interval 47 during the ignition process (not illustrated), which has been introduced by actuating a pushbutton.

The fast recurrent forward/backward movement of the welding wire 13 is effected, e.g., at a frequency adjusted to 75 Hz. The slag 42 has been successfully removed if the control unit 4 and/or the short-circuit monitoring unit detects a short circuit after several contacts of the welding wire 13 with the workpiece 16, and, then, the welding process will be introduced and/or the ignition process will be continued.

Of course, the slag-removing process may also be used with any ignition processes known, e.g. also with high-frequency ignition.

For example in case of high-frequency ignition the slag-removing process is effected in that the slag-removing process is performed before the high-frequency ignition (not illustrated). After the slag-removing process has been finished, the welding wire 13 will be appropriately positioned, and the ignition process will be started. With high-frequency ignition the electric arc is ignited with a high-frequency pulse in a contactless manner.

In order to almost completely exclude an ignition of the electric arc 15 during the slag-removing process, the welding current I is preferably reduced to a low value, e.g. to below 10 A. Thus, also at point of time 45, where the slag 42 is removed, it is ensured that the welding wire 13 will not burn onto the workpiece 16 or that an electric arc 15 will not unintentionally be ignited during the next backward movement of the welding wire 13. After the slag-removing process has been finished, the welding current I will again be increased to the welding current I originally set so that the ignition process and/or the welding process following thereupon can be done unconditionally.

The slag-removing process may, e.g., also be timely restricted so that the slag-removing process will not require unnecessarily much time if the slag 42 cannot be detached by the recurrent forward/backward movement and/or the contacts with the workpiece 16. Here, the time will be started as soon as the slag 42 adhering to the end of the welding wire 13 to be contacted first contacts the workpiece 16. This is detected by means of the motor-current monitoring unit already described.

Of course, not only slag 42 adhering to the end of the welding wire 13 may be removed by the inventive slag-removing process but also slag 42 possibly adhering to the workpiece 16. In this case, the electric arc 15 is also prevented from being ignited, with the slag 42 being correspondingly removed from the workpiece 16 by one of the slag-removing-process variants described above. Here, of course, it may also be the case that the slag 42 will be removed from the end of the welding wire 13 to be contacted and from the workpiece 16 at the same time.

After the slag-removing process has been optionally done during the ignition process and after the latter has been finished, the welding process proper will take place.

After the electric arc 15 has been ignited, e.g., by the SFI process, the welding wire 13 will be moved backwards from the workpiece 16 as far as to an upper dead point 32 until a defined distance 33 has been reached and/or a defined period of time has passed. During the ignition phase 31 in one or several stage(s) the current is limited such that the welding wire 13 cannot melt.

After the electric arc 15 has been ignited and/or after the distance 33 has been reached, a first short stabilizing phase 34 may be performed with high energy introduction (as illustrated with dotted lines) over a defined period of time prior to the welding process proper, and the welding process established by the cyclically recurrent welding-process phases may then be done. This offers the advantage that a stabilization of the electric arc 15 and/or a heating of the workpiece 16 and/or the melting bath is achieved by this short stabilizing phase 34 with high energy introduction. Moreover, the welding wire 13 will be heated by the ignition process and the welding process following thereupon may start with the pre-heated welding wire 13, thus substantially increasing welding quality.

After the ignition phase 31 and/or the stabilizing phase 34 has (have) taken place, the welding process proper will be performed at point of time 35, wherein, e.g., a CMT welding process is done which will now be shortly described.

During the CMT process, in the process-phase denoted electric-arc phase 36, the welding wire 13 is fed forwards until contact with the workpiece 16. In the electric-arc phase 36 the welding wire 13 is melted on so that a drop 37 forms at the end of the welding wire. During the electric-arc phase 36 the welding current and/or the welding voltage is controlled such that no drop will detach, and, at point of time 38, that a short-circuit will occur introducing the short-circuit phase 39. In the short-circuit phase 39 the wire-feed direction is reversed so that the welding wire 13 will be fed backwards from the workpiece 16 until the short circuit has been opened, i.e. the electric arc 15 has been formed, and/or until a defined distance 33 has been reached and/or until a defined period of time has passed. At point of time 35, the electric-arc phase 36 is again effected, whereupon the feed direction of the welding-wire 13 will again be reversed at an upper dead point 32 and the welding wire 13 will be moved towards the workpiece 16.

During the welding process, the welding wire 13 is subjected to an oscillating movement at a certain movement frequency corresponding to the number of short circuits per second. The movement frequency is, e.g., 75 Hz, from which 75 short circuits per second follow. Here, the wire feeder 11 is substantially controlled such that a negative signal will be given and/or the welding wire 13 will be fed backwards in the short-circuit phase 39, whereupon an electric arc 15 will be established, and a positive signal will be given and/or the welding wire 13 will be fed forwards towards the workpiece 16 in the electric-arc phase 36 during which the welding wire 13 will be heated and/or melted on for drop formation. However, controlling the movement direction of the welding wire 13 does not necessarily have to correlate with the occurrence of the electric-arc phase 36 and/or the short-circuit phase 39 since the electric-arc phase 36 may be effected by an intended energy introduction via controlling the current level in the welding circuit, e.g. already during the backward movement of the welding wire 13. That is to say, in case of an already established electric arc 15, the welding wire 13 may also be fed away from the workpiece 16 until a defined point of time and/or distance has been reached.

Drop detachment is effected in a manner that after the dead point has been reached the welding wire 13 will be moved forwards until contact of the filler material with the workpiece 16, particularly a melting bath. Due to the surface tension of the drop 37 on the welding wire 13 and in the melting bath and/or further known active, physical effects the drop 37 is detached from the welding wire 13. The backward movement of the welding wire 13 promotes re-ignition of the electric arc 15. In order to assist the drop detachment, of course, the welding current I may be increased, particularly in a shock-like manner, during the short-circuit phase 39 (not illustrated). During the CMT process the electric-arc phase 36 and the short-circuit phase 39 alternate periodically in the exemplary embodiment shown.

From FIG. 3 it can also be seen that the voltage U and/or the current I will be increased to a first level as soon as the point of time 35 is exceeded. Optionally, this level may be determined as working level which, during the whole electric-arc phase 36 and the short-circuit phase 39, will be constantly kept and/or will follow a welding-process profile. As can be seen from diagram 28, the welding current I preferably has a first portion, the welding current 40, and at least a further portion, the basic current 41, which ensures a safe re-ignition of the electric arc 15.

Compared to the working current 40, the basic current 41 is preferably relatively low, wherein the current strength of the working current 40 may be by 1.5-times to 10-times, particularly 4-times to 8-times, higher than the current strength of the basic current 41. For example, the basic current 41 may be from 5 A to 50 A, particularly about from 10 A to 30 A, whereas the working current 40 may be from 50 A to 500 A, e.g.

Further details of the CMT process in terms of method will not be addressed here since this CMT process for welding processes with constant or alternating polarity of the welding current on the welding wire 13 and/or the workpiece 16 has already been known from the prior art.

Of course, the slag-removing process may also be performed at the end of a welding seam produced by an appropriate welding process or of a workpiece 16 produced, which consists of several welding seams. Thus, the slag 42 will be detached from the end of the welding wire 13 to be contacted, thereby ensuring a safe ignition of the electric arc 15 at the beginning of the following welding seam on the workpiece 16.

The invention claimed is:

1. A method for removing slag from an end of a consuming welding wire for welding a workpiece, comprising: moving the welding wire towards the workpiece by a wire feeder during a welding process, with an electric arc burning between the welding wire and the workpiece, starting and performing a slag-removing process from the end of the welding wire, reducing a welding current to a selected minimum value as soon as the slag-removing process is started, cyclically moving the welding wire towards the workpiece by a predetermined path length in a recurrent forward and backward movement during the slag-removing process, and moving the welding wire again away from the workpiece by a selected path length shorter than the predetermined path length until short-circuit detection between the welding wire and the workpiece by a short-circuit monitoring unit for terminating the slag-removing process.

2. The method according to claim 1, wherein the slag-removing process is performed immediately following the start of a method for igniting the electric arc.

3. The method according to claim 1, wherein the slag-removing process is performed during a method for igniting the electric arc.

4. The method according to claim 1, wherein the slag-removing process is performed prior to a method for igniting the electric arc.

5. The method according to claim 1, wherein after the slag has been removed, the electric arc will be ignited by an ignition method, wherein a selected welding current is applied to the welding wire and the welding wire will be continuously moved forwards in a wire-feed direction towards the workpiece until contacting the workpiece, the wire-feed direction will be reversed after a short circuit has occurred, and the welding wire will be continuously moved away from the workpiece so that the electric arc will be ignited when the welding wire is lifted off.

6. The method according to claim 1, wherein the motor current of the wire feeder is monitored, and at least a first contact of the welding wire with the workpiece is detected.

7. The method according to claim 6, wherein the contact of the welding wire with the workpiece will be detected when the welding current has exceeded a predefined threshold value over a defined period of time.

8. The method according to claim 1, wherein the cyclic, recurrent forward and backward movement of the welding wire is done for removing the slag at an adjustable frequency of between 50 Hz and 150 Hz.

9. The method according to claim 8, wherein the cyclic, recurrent forward and backward movement of the welding wire is done for removing the slag at a frequency equal to the movement frequency of the welding wire during the welding process set.

10. The method according to claim 1, wherein as soon as the slag-removing process ends, the welding current will be increased to an increased value greater than the selected minimum value.

11. The method according to claim 1, wherein the slag-removing process will be finished after a selected period of time following short-circuit detection by the short-circuit monitoring unit.

12. The method according to claim 11, wherein the adjusted period of time, after which the slag-removing process will be finished, will be started when the welding wire first contacts the workpiece, with no short circuit having been detected.

* * * * *

UNITED STATES PATENT AND TRADEMARK OFFICE
CERTIFICATE OF CORRECTION

PATENT NO.       : 8,389,900 B2
APPLICATION NO. : 12/226242
DATED            : March 5, 2013
INVENTOR(S)      : Artelsmair et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this
First Day of September, 2015

Michelle K. Lee
*Director of the United States Patent and Trademark Office*